E. G. TIDLUND.
DYNAMO ELECTRIC MACHINE.
APPLICATION FILED JAN. 10, 1916.

1,291,263.

Patented Jan. 14, 1919.

WITNESSES:
Fred H. Miller
W. B. Wells

INVENTOR
Edwin G. Tidlund
BY
Wesley G. Carr
ATTORNEY

UNITED STATES PATENT OFFICE.

EDWIN G. TIDLUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,291,263.      Specification of Letters Patent.      Patented Jan. 14, 1919.

Application filed January 10, 1916. Serial No. 71,167.

*To all whom it may concern:*

Be it known that I, EDWIN G. TIDLUND, a subject of the King of Sweden, and a resident of Pittsburgh, in the county of Allegheny and State of Pennsylvania, have invented a new and useful Improvement in Dynamo-Electric Machines, of which the following is a specification.

My invention relates to dynamo-electric machines and particularly to railway motors that are adapted for suspension upon the driving axles of the vehicles upon which they are mounted.

One object of my invention is to provide a machine of the above indicated character which shall be simple, compact and durable in construction; which may be manufactured and overhauled at relatively small expense and which shall materially decrease the weight of such apparatus per unit of power.

Another object of my invention is to provide a relatively light-weight motor which shall comprise a lower half-frame that is adapted to receive and support a unitary laminated core structure and is provided with removable bearing housings that are seated in the end portions of the half-frame and rigidly held in place by brackets which are mounted on the frame and half encircle the bearing housings.

In the recent development of railway motors, endeavor has been made to reduce the weight and cost per unit of power output and particularly so in motors of the alternating-current type which are inherently relatively heavy and bulky. The motor frames have been lightened in every way consistent with requisite strength and rigidity.

According to my present invention, I provide a motor of the railway type having a lower half-frame member only in which the magnetizable core is seated and positioned. Each end of the frame member is provided with a seat for an armature-bearing housing, and, mounted on the frame member and half encircling the housings, are brackets which give the motor the rigidity of a motor provided with an upper, as well as a lower, half-frame.

Figure 1:
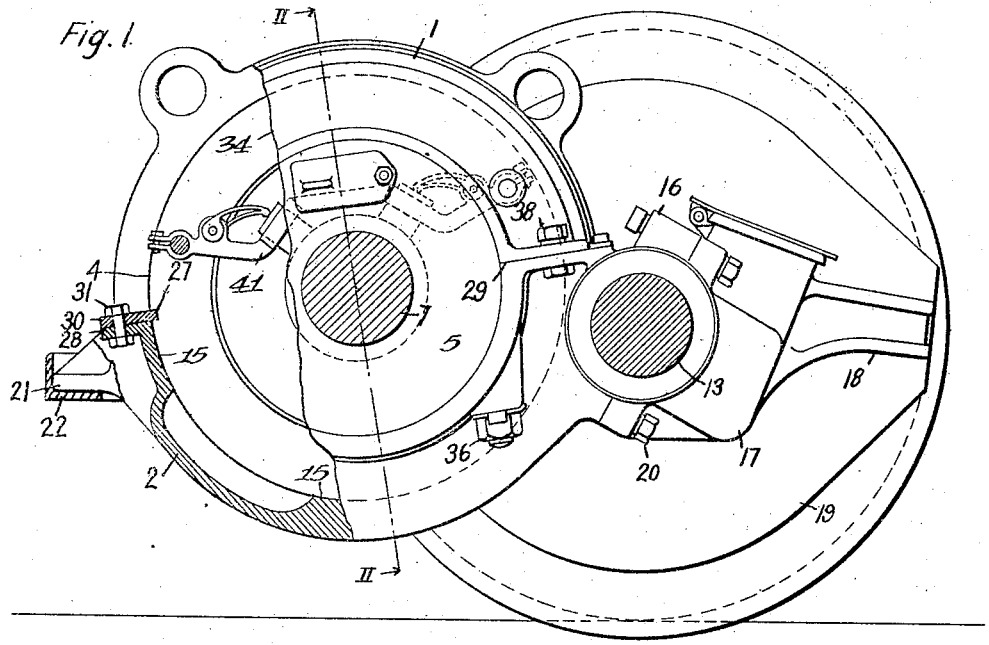
Figure 2:
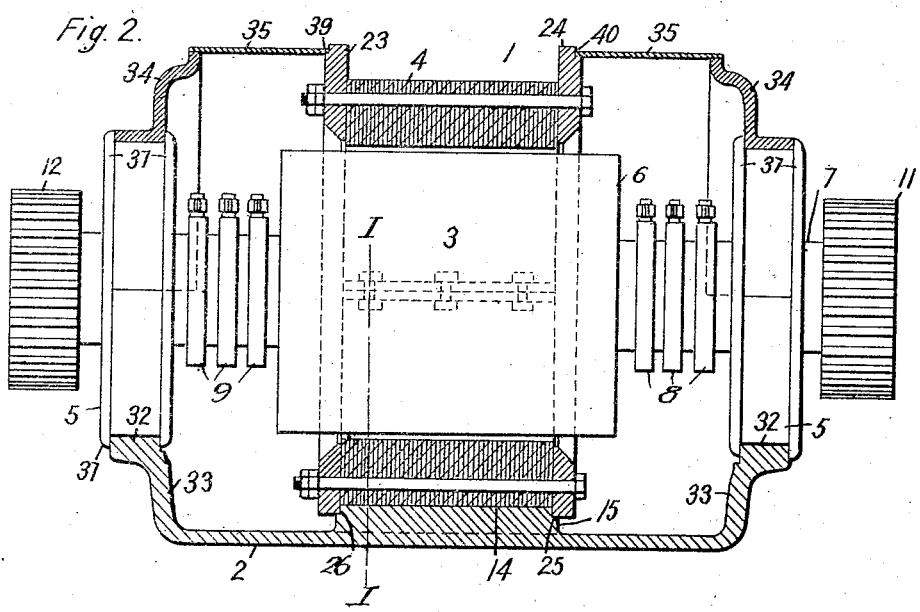

In the accompanying drawing illustrating my invention, Figure 1 is an end elevation, partially in section, of a motor embodying my invention, and Fig. 2 is a section along the line II—II of Fig. 1.

Referring to the drawing, a motor 1 is shown embodying a lower half-frame 2, a rotor 3, a laminated stator core 4 and armature-bearing housings 5.

The rotor 3 embodies an armature 6, a shaft 7, collector rings 8 and 9 disposed at the respective ends of the armature and pinions 11 and 12 disposed on the ends of the shaft 7.

The lower half-frame 2 is mounted on an axle 13 of the car or vehicle and is shown as substantially semi-cylindrical in form, although it is not essentially so, except as this form lends itself to lightness and strength of construction. The half-frame is provided substantially midway between its ends with a semi-cylindrical seat 14 upon which the magnetizable core 4 rests. The seat 14 is composed of a number of projections 15 on the half-frame 2.

One side of the half-frame 2 is provided with two integral axle bearings 16 (one only of which is shown) of well known construction with which removable axle caps 17 respectively coöperate for the purpose of surrounding the driving axle 13 and supporting one side of the motor thereon, in accordance with customary practice. One axle cap is provided with a projecting arm 18 for supporting one end of a gear case 19. The axle caps are positioned by bolts 20. The other side of the half-frame 2 is provided with an integral nose projection 21 which is adapted to rest on a member 22 that constitutes a part of the truck frame.

The magnetizable core 4 preferably comprises a unitary cylindrical structure composed of a plurality of laminations that are assembled in side-by-side relation between a pair of end plates 23 and 24 which are riveted or bolted together in any convenient manner. The seat 14 of the half-frame 2 and the periphery of the magnetizable core 4 are machined so that the core is accurately positioned when lowered into place. The end plates 23 and 34 project slightly beyond the sides of the seat 14 and are adapted to rest upon shoulders 25 and 26 in the projections 15 to prevent longitudinal displacement of the core.

The core 4 is provided, at diametrically opposite points, with grooves 27 (one only being shown) which are so located with respect to the upper surfaces 28 and 29 of the sides of the half-frame that the core 4 may be rigidly clamped in position by clamping members 30 and coöperating bolts 31. The clamping members 30 project inwardly beyond the sides of the frame into the grooves 27.

The bearing housings 5 are cylindrical in form and are adapted to rest on semi-cylindrical seats 32 in end portions 33 of the half-frame 2. Semi-cylindrical brackets 34, which are mounted on the half-frame 2, encircle the upper halves of the housings. The housings are held in the seats 32 by means of bolts 36 and are precluded from longitudinal movement by means of the rim projections 37 which extend along the sides of the seats 32 and the brackets 34.

The brackets 34 are rigidly held on the half-frame 2 by means of bolts 38 and thus not only lend strength and rigidity to the motor but also support the bearing housings in position.

Covers 35, which are preferably made of sheet metal, are provided for inclosing the ends of the machine. The covers are disposed upon the tops of the brackets 34 and upon the shoulders 39 and 40 of the end plates 23 and 24, respectively, and may be held in position by bolts or clamps in any convenient manner.

Although my invention has been illustrated by an alternating current machine provided with collector rings, I do not consider my invention restricted to this type of machine, as direct current machines may be constructed in accordance with my invention. It may also be noted that the brush rigging 41 may be mounted on the brackets 34 in a manner similar to the usual way of mounting brushes on the frames of dynamo-electric machines.

Various modifications in the apparatus and improvements in the operation thereof may be effected without departing from the spirit and scope of my invention, and I desire, therefore, that only such limitations shall be imposed as are indicated in the appended claims.

I claim as my invention:

1. A railway motor adapted to be suspended from a driving axle and comprising a stationary magnetizable core, a lower half-frame for supporting said core, said frame having seats in the end portions thereof, bearing housings mounted in said seats, and semi-cylindrical brackets mounted on the ends of said half-frame and engaging said bearing housings to hold the same in place.

2. A railway motor adapted to be suspended from a driving axle and comprising a lower half-frame having a semi-cylindrical seat and also having means for supporting one side of said frame on said driving axle, said frame also having semi-cylindrical end brackets integral therewith and provided with seats therein, a stationary laminated magnetizable core supported on the semi-cylindrical seat in said half-frame, bearing housings mounted in said seats in said end brackets, and semi-cylindrical brackets mounted on the ends of said half-frame and half encircling said bearing housings.

3. A railway motor adapted to be suspended from a driving axle and comprising a stationary magnetizable core, end plates secured to the sides of said core, a lower half-frame provided with end brackets and also having a seat for supporting said core, said seat having shoulders at the sides thereof upon which said end plates are adapted to rest, bearing housings mounted on said end brackets, and brackets mounted on the ends of said half-frame and half encircling said bearing housings to hold the same in place.

4. A railway motor adapted to be suspended from a driving axle and comprising a stationary cylindrical laminated core, a lower half-frame for supporting said core, armature-bearing housings mounted in said frame, brackets mounted on said frame and half encircling said housings, and covers for the upper half of the motor, said covers being mounted on said brackets and said frame.

5. A motor comprising a stationary cylindrical laminated core, a lower half-frame having a semi-cylindrical seat for supporting said core, means for positioning said core rigidly in said frame, armature-bearing housings mounted in said frame, brackets mounted on said frame and half encircling said housings, and covers supported on said core and said brackets.

6. A railway motor adapted to be suspended from a driving axle and comprising a stationary cylindrical laminated core, a lower half-frame having a semi-cylindrical seat for supporting said core, means for positioning said core rigidly in said frame, armature-bearing housings mounted in said frame and brackets mounted on said frame, said brackets half encircling said housings.

In testimony whereof, I have hereunto subscribed my name this 31st day of Dec. 1915.

EDWIN G. TIDLUND.

Copies of this patent may be obtained for five cents each, by addressing the "Commissioner of Patents, Washington, D. C."